United States Patent [19]

Chiou et al.

[11] 3,927,102

[45] Dec. 16, 1975

[54] SEPARATION AND RECOVERY OF SECONDARY ALKYL PRIMARY AMINES

[75] Inventors: Jackson K. S. Chiou, Fishkill; Ronald E. Jones, Glenham, both of N.Y.

[73] Assignee: Texaco Inc., New York, N.Y.

[22] Filed: Aug. 21, 1974

[21] Appl. No.: 499,372

[52] U.S. Cl. .......................................... 260/583 N
[51] Int. Cl.² ................ C07C 76/06; C07C 85/26
[58] Field of Search ........ 260/583 P, 583 K, 583 N, 260/584 R, 583 M

[56] References Cited
UNITED STATES PATENTS

| | | | |
|---|---|---|---|
| 2,237,628 | 4/1941 | Olin et al. | 260/583 N |
| 3,417,141 | 12/1968 | Feldman et al. | 260/583 N X |
| 3,470,250 | 9/1969 | Patterson et al. | 260/583 M |
| 3,470,252 | 9/1969 | Doyle et al. | 260/583 M |

*Primary Examiner*—Allen B. Curtis
*Attorney, Agent, or Firm*—T. H. Whaley; C. G. Ries; George J. Darsa

[57] ABSTRACT

A method for the separation of $C_{14}$ to $C_{30}$ secondary alkyl primary amines from crude mixtures containing, in addition to the amine, paraffins, ketones, alcohols and polyfunctionals wherein the crude mixture is initially treated with an acid, water and low molecular weight alcohol thereby forming an aqueous amine salt layer, separating the low molecular weight alcohol from the aqueous layer, treating the aqueous layer with a base and separating the amines from the aqueous layer.

21 Claims, No Drawings

SEPARATION AND RECOVERY OF SECONDARY ALKYL PRIMARY AMINES

BACKGROUND OF THE INVENTION

This invention relates to a process for the separation and recovery of amines from crude mixtures containing the same. In particular, this invention relates to the separation and recovery of secondary alkyl primary amines having from 14 to 30 carbon atoms from mixtures containing paraffins, oxygenates and polyfunctional compounds.

The preparation of secondary alkyl primary amines has been heretofore described in U.S. Pat. No. 3,470,252. Illustratively, paraffin hydrocarbons are initially nitrated with, for example, nitric acid or nitrogen dioxide to secondary mono-nitroparaffins and the nitroparaffins are thereafter reduced with hydrogen in the presence of a hydrogenation catalyst. Generally, the art has found it desirable to convert from about 5 to 50 percent of the paraffin to the corresponding nitroparaffin which in turn is hydrogenated to the amine. In the course of such nitration and hydrogenation, by-products are also formed. The crude hydrogenated mixture following nitration and hydrogenation provides not only the desired amine but additionally contains unreacted paraffin, nitroparaffin and by-products of each of the previous reactions including ketones, alcohols and polyfunctionals. In U.S. Pat. No. 3,470,251 a process is set forth whereby secondary alkyl primary amines are separated and recovered from such crude hydrogenated mixtures by initially treating the crude composition with an inorganic acid, such as hydrochloric acid, and water, separating an aqueous phase containing the amine hydrochloride, washing the aqueous amine salt layer with a liquid hydrocarbon, and springing the amine with a base. While that process in many instances yields amine products of high purity, the recovery of the higher molecular weight amines, such as amines having from 14 to 30 carbon atoms, and prepared from slack waxes, leaves room for improvement inasmuch as the solubility of the amine salt in water decreases as the molecular weight of the amine salt increases. For example, the solubility of $C_{22}$ secondary alkyl primary amine hydrochloride in water generally amounts to but a few percent.

It is therefore an object of this invention to provide an improved process for the separation and recovery of secondary alkyl primary amines from mixtures containing the same.

Another object of this invention is to provide a process wherein $C_{14}$ to $C_{30}$ secondary alkyl primary amines may be separated from crude hydrogenated nitroparaffin mixtures in good purity.

Yet another object of this invention is to provide a process wherein secondary alkyl primary amines having from 14 to 30 carbon atoms may be separated from crude hydrogenated nitroparaffin mixtures in high yields.

Other objects and advantages will become apparent from a reading of the following detailed description and examples.

SUMMARY OF THE INVENTION

Broadly, this invention contemplates a process for the separation and recovery of a secondary alkyl primary amine having from 14 to 30 carbon atoms from a crude hydrogenated nitroparaffin composition containing the above amine along with a $C_{14}$ to $C_{30}$ alcohol, ketone and paraffin hydrocarbon which comprises treating said crude composition with an acid, water and a low molecular weight alcohol thereby forming an aqueous and a hydrocarbon layer; separating the aqueous layer from the hydrocarbon layer and removing the alcohol from the aqueous layer, treating the aqueous layer with a base to free the amine and separating the secondary alkyl primary amine from the treated aqueous layer.

The secondary alkyl primary amine separated and recovered by the instant process and contained in the crude hydrogenated nitroparaffin mixture is derived from a normal paraffin hydrocarbon or paraffin hydrocarbon mixture having from 14 to 30 carbon atoms, as for example a slack wax. To prepare the crude hydrogenated nitroparaffin mixture, the paraffin hydrocarbon is initially nitrated with nitrogen dioxide or nitric acid at temperatures of about 250° to 500°F. to a secondary mono-nitroparaffin wherein the nitro group is predominantly and randomly located on other than the paraffins' terminal carbon atoms. In general, from 5 to 50 weight percent of the paraffin is nitrated to the nitroparaffin and by-products such as alcohols, ketones, acids and polyfunctionals including nitroalcohols, dinitroparaffins, nitroketones and nitroolefins. The by-products can constitute from 0.5 to 15 weight percent of the nitrated mixture.

The secondary mono-nitroparaffin in the nitrated mixture is subsequently hydrogenated in the presence of a hydrogenation catalyst to the corresponding secondary alkyl primary amine and the hydrogenated mixture additionally contains unconverted paraffin, alcohol, ketone and polyfunctionals. It will be understood that amines separated by the instant process can be of substantially uniform or mixed chain lengths as for example from crude hydrogenated products containing secondary alkyl primary amines such as aminohexadecanes, aminoheptadecanes, aminooctadecanes, aminoeicosanes, or aminopentacosanes or mixtures of $C_{14}$ to $C_{30}$ amines.

We have now found that the separation and purification of amines having from 14 to 30 carbon atoms from crude hydrogenated mixtures containing the amine can be effectively carried out such that the amines are recovered in good yields and high purities by initially treating the crude hydrogenated nitroparaffin compositions with a combination of an acid, water and low molecular weight alcohol thereby forming an aqueous amine salt layer that can be separated from a hydrocarbon layer.

In the initial stage of our process the crude hydrogenated mixture is contacted with an acid, for example an inorganic acid such as hydrochloric acid, nitric acid, sulfuric acid or phosphoric acid or a $C_2$ to $C_6$ organic acid such as acetic acid, propionic acid, n-butyric acid, isobutyric acid, benzoic acid and crotonic acid. Preferably, we employ a $C_2$ to $C_4$ organic acid including acetic acid, proprionic acid, n-butyric acid and isobutyric acid. In a highly preferred embodiment we employ acetic acid. The organic acids are preferred inasmuch as inorganic acids require the use of expensive corrosion resistant equipment. Further, the use of an organic acid in this process has been found to provide an amine product of the highest purity.

The introduction of a low molecular weight alcohol in combination with the acid and water in the initial treating step provides a number of advantages. The presence of the alcohol overcomes the serious phase separation problem due to emulsification which occurs when an organic acid is employed and which in the absence of the alcohol prohibits the separation of the aqueous phase from the hydrocarbon phase. When inorganic acids are employed, the solubility of their amine salts in the aqueous layer is improved when an alcohol is present. In general, the solubility of the amine salts, be they derived from the use of organic or inorganic acids, is increased in the aqueous layer by employing the alcohol specified herein in conjunction with water and in the amounts and ratios specified herein. The improved solubility of the amine salts in the resulting aqueous layer provides the instant process with high yields of the ultimately desired amines. It will be appreciated that the use of other organic solvents in place of the low molecular weight alcohol which solubilize substantial amounts of paraffin along with the amine salt in the aqueous layer is deleterious to the instant process.

An important aspect of this invention involves the amount of water and low molecular weight alcohol used to treat the crude hydrogenated composition. When the amounts and ratios of water and alcohol specified herein are employed, two easily separated phases are formed, namely an aqueous phase and a hydrocarbon phase. The hydrocarbon phase is composed of primarily the $C_{14}$ to $C_{30}$ paraffin, alcohol, ketone, unreduced nitroparaffin and polyfunctionals. The aqueous phase contains predominantly the amine salt formed by reaction of the amine and acid along with water, low molecular weight alcohol and some $C_{14}$ to $C_{30}$ alcohol, ketone, paraffin and polyfunctionals. Suitably, we employ from about 1.5 to 25 parts by weight of water and alcohol per part by weight of amine in the crude composition and preferably from about 4 to 15 parts by weight. Further, the weight ratio of water to alcohol ranges from about 1:0.4 to 1:20, preferably 1:1 to 1:4. Amounts of water and alcohol below that set out above are generally insufficient to substantially solubilize the amine salt and while amounts of water and alcohol in excess of 25 parts by weight can be utilized, the same is undesirable in that excessively large separation vessels would be needed.

As mentioned above, the low molecular weight alcohol when present in the amounts set out herein assists in solubilizing the higher molecular weight amine salt in the aqueous layer. When organic acids are used, the alcohol additionally acts to deter emulsification and readily permits the separation of the aqueous and hydrocarbon phases. The use of the alcohol in combination with an organic acid, such as acetic acid, provides a lower paraffin solubility in the aqueous layer and ultimately give rise to a higher purity amine product. The low molecular weight alcohols employed are in general alkanols of from 1 to 4 carbons as, for example, methanol, ethanol, propanol, butanol and isobutanol. Preferred alcohols are methanol and ethanol.

The amount of acid employed in the initial treating step is sufficient to provide the aqueous phase formed by the addition of water and low molecular weight alcohol with a pH ranging from 2 to 7 and preferably a pH of between about 3 and 6.5. The addition of excess acid such that the aqueous phase possesses a pH of below 2 should be avoided inasmuch as these conditions lead to the displacement of the amine salt from the aqueous layer into the hydrocarbon layer. Where insufficient acid is employed such that the aqueous phase possesses a pH of above 7 a substantial amount of amine will remain unconverted to the amine salt and such unconverted amine is substantially found in the hydrocarbon phase. In general, amounts of from about 1 to 1.6 mole of acid, and preferably from about 1 to 1.3 mole of acid per mole of secondary alkyl primary amine in the crude hydrogenated mixture are employed.

The aqueous layer formed by treating the crude composition with the aforementioned acid, water and low molecular weight alcohol contains the amine salt along with some paraffin, alcohol, ketone and polyfunctional having from 14 to 30 carbons. The paraffin content of the aqueous layer can be further reduced and the amine salt content of the aqueous phase increased by undertaking the initial treating of the crude composition at temperatures of from about 50° to about 250°F., preferably between 100° to 200°F., under atmospheric or higher pressures. Agitating the mixture also assists in reducing the paraffin content of the aqueous layer. The treated composition is thereafter permitted to separate while at about 50° to 250°F. into an aqueous phase and a hydrocarbon phase.

The aqueous phase is thereafter separated, suitably by decantation, and the low molecular weight alcohol contained in the aqueous phase is separated therefrom as, for example, by distillation. If desired, the aqueous phase denuded of low molecular weight alcohol can be contacted with a liquid hydrocarbon having from 4 to 10 carbon atoms at a temperature ranging from about 50° to 212°F. to extract non-amine salt components such as $C_{14}$ to $C_{30}$ paraffin, ketone, alcohol and polyfunctionals which may not have been carried along in the hydrocarbon phase. Applicable liquid hydrocarbons include aliphatic hydrocarbons, olefins, cycloaliphatics or aromatics and we prefer to employ heptane. By washing the aqueous amine salt layer with the liquid hydrocarbon, $C_{14}$ to $C_{30}$ paraffins, ketones, alcohols and polyfunctionals are extracted from the aqueous phase.

The resulting aqueous phase following removal of the low molecular weight alcohol, and if desired after contacting with a liquid hydrocarbon, is subsequently treated with at least a stoichiometric amount of base, suitably from about 1 to 3 moles of base per mole of acid added in the initial treating step, thereby springing the amine from the aqueous phase. Appropriate bases includes sodium or potassium hydroxide, alkaline earth metal hydroxides or oxides, carbonates or acid carbonates such as sodium carbonate or sodium bicarbonate or lime. Ammonia or ammonium hydroxide can also be employed. The amine is recovered by phase separation where an aqueous layer containing the alkali, alkaline earth or ammonium salt of the acid employed in the original treating stage.

The amine layer recovered by phase separation contains approximately from about 80 to 90 percent amine. Higher purities of amine up to 95 percent can be obtained by a flashing the amine layer and removing residual water and liquid hydrocarbons.

In order to more fully illustrate the nature of this invention and manner of practicing the same, the following examples are presented.

EXAMPLE I 145.3 pounds of a $C_{14}$–$C_{28}$ slack wax containing by volume 81 percent n-paraffins, 3.7 percent branched paraffins, 12.0 percent naphthenes, and 3.3 percent aromatics, with a carbon chain length distribution on a weight percent basis of $C_{14}$—0.4, $C_{15}$—1.1, $C_{16}$—2.5, $C_{17}$—7.3, $C_{18}$—13.7, $C_{19}$—16.4, $C_{20}$—16.5, $C_{21}$—14.7, $C_{22}$—12.0, $C_{23}$—8.0, $C_{24}$—4.1, $C_{25}$—2.0 and $C_{26}$—1.1, is charged into a 25 gallon reactor and heated to 330°F. Nitrogen dioxide, at about 330°F., is continuously charged into the stirred reactor at a rate of 10.4 pounds per hour for 1.5 hours. Off-gases from the reactor are condensed, vaporized organic material and water introduced to a separator and the organic phase is returned to the reactor.

The nitrated wax is cooled to about 150°F. while purging with nitrogen and thereafter washed once with 15.4 pounds of 10 weight percent aqueous sodium hydroxide and twice with 77 pounds of water at about 150°F. A total of 137.1 pounds of washed nitrated wax is obtained comprising 24.6 weight percent nitroparaffins, 1.8 weight percent oxygenates, 1.2 weight percent nitrates and nitrites and 72.4 weight percent paraffins and naphthenes.

The washed nitrated wax is introduced to a hydrogenation reactor containing a palladium on carbon hydrogenation catalyst wherein hydrogenation of nitroparaffins to amines is undertaken at 250° to 400°F. and 550 p.s.i.g. A total of 134.4 pounds of crude hydrogenated product is obtained comprising 22.4 weight percent alkylamines, 0.3 weight percent nitroparaffins, 1.8 weight percent oxygenates and 75.5 weight percent paraffins and naphthenes.

134.4 pounds of the $C_{14}$–$C_{28}$ crude hydrogenated product is charged to a separation vessel along with 8.0 pounds of acetic acid, 172.1 pounds of methanol and 57.4 pounds of water, the weight of water and methanol to amines in the crude composition being 7.62 to 1, the weight of water to methanol being 1 to 3 and where the mole ratio of acid to secondary alkyl primary amines is 1.3 to 1. The mixture is agitated at about 140°F. for one hour and permitted to settle for about one hour. 268.4 pounds of an aqueous layer having a pH of about 6 is drawn from the bottom of the vessel.

The aqueous layer is stripped of methanol at 150°F. and 10 mm Hg pressure. About 16 pounds of a 40 weight percent sodium hydroxide aqueous solution is introduced to the aqueous phase with stirring thereby neutralizing the amine acid salt and the mixture is allowed to settle and separate into two layers. The bottom aqueous layer is drawn off and the amine phase is washed twice with 15.8 pounds of water at 140°F. and the amine is recovered by stripping water at about 245°F. 30 pounds of amine product is recovered corresponding to a yield of 94 percent and the product contains in excess of 90 percent $C_{14}$–$C_{28}$ secondary alkyl primary amines.

EXAMPLE II

To a 500 cc. separation vessel there is charged 120 grams of a $C_{14}$–$C_{28}$ crude hydrogenated product containing 22.6 weight percent amines, 0.3 weight percent nitroparaffins, 1.8 weight percent oxygenates and 75.3 weight percent paraffins and naphthenes along with 12 grams of HCl, 170 grams of methanol and 48 grams of water, the weight of water and alcohol to amines in the crude composition being 8.04 to 1, the weight of water to methanol being 1 to 3.54 and where the mole ratio of acid to secondary alkyl primary amine is 1.3 to 1. The mixture is agitated for one-half hour and permitted to settle for about one hour at about 140°F. 90 grams of hydrocarbon layer is recovered. 260 grams of an aqueous layer is drawn from the vessel and the aqueous layer is stripped of methanol at 10 mm. Hg and 150°F. About 40 grams of a 20 weight percent sodium hydroxide solution is introduced to the aqueous layer and, following settling, the resulting amine and aqueous layers are separated. The amine layer is washed with 100 grams of water at 140°F. and the amine is recovered by stripping water at 10 mm. Hg and 160°F. 29 grams of $C_{14}$ to $C_{28}$ secondary alkyl primary amine is recovered corresponding to a yield of 97 percent and containing 87.7 percent amine.

EXAMPLE III

To a 500 cc. separation vessel there is charged 100 grams of a $C_{14}$–$C_{28}$ crude hydrogenated product containing 22.1 weight percent amines, 0.3 weight percent nitroparaffins, 1.8 weight percent oxygenates and 75.8 weight percent paraffins and naphthenes along with 6 grams of acetic acid, 165 grams of methanol and 55 grams of water, the weight of water and alcohol to secondary alkyl primary amines in the crude composition being 10 to 1, the weight of water to methanol being 1 to 3 and where the mole ratio of acid to secondary alkyl primary amine is 1.3 to 1. The mixture after agitating for one-half hour and settling for one hour is separated at 147°F. 76 grams of hydrocarbon layer and 250 grams of an aqueous layer is recovered. The aqueous layer is stripped of methanol at 10 mm. Hg and 150°F. and thereafter 40 grams of a 20 weight percent sodium hydroxide solution is introduced to the aqueous layer. After settling, the resulting amine and aqueous layers are separated and the amine layer is washed with 75 grams of water at 145°F. The amine is recovered by stripping water at 10 mm. Hg and 160°F. 20 grams of $C_{14}$ to $C_{28}$ secondary alkyl primary amine is recovered corresponding to a yield of 94 percent and containing 93.5 percent amine.

EXAMPLE IV

To a separation vessel there is charged 150 grams of a $C_{14}$ to $C_{28}$ crude hydrogenated product containing 24.0 weight percent amines, 7.4 grams of acetic acid and 687 grams of water. The mixture is heated to 200°F. with agitation and an emulsion occurs. The experiment was repeated except 317 grams of water is added. Again an emulsion occurs and the mixture becomes a single phase.

It is seen that we have provided a significantly useful process for separating and recovering secondary alkyl primary amines having from 14 to 30 carbons. Compared to the prior procedures we can employ either inorganic or organic acids, the problems associated with emulsion formation is overcome and a 90 percent amine product is obtained in the absence of vacuum distillation.

We claim:

1. A process for the separation and recovery of a secondary alkyl primary amine having from 14 to 30 carbon atoms from a crude hydrogenated nitroparaffin composition containing said amine and a $C_{14}$ to $C_{30}$ alcohol, ketone and paraffin hydrocarbon which comprises:

a. treating said crude composition with an acid, water and a low molecular weight alcohol thereby forming an aqueous and a hydrocarbon layer the parts by weight of water and alcohol per part by weight of amine in the crude composition in (a) being from about 1.5 to 25 and the weight ratio of water to alcohol in (a) ranges from about 1:0.4 to 1:20;
b. separating said aqueous layer of (a) and removing low molecular weight alcohol from said aqueous layer;
c. treating said aqueous layer of (b) with a base; and
d. separating said secondary alkyl primary amine from said treated aqueous layer of (c).

2. A process according to claim 1 wherein said low molecular weight alcohol is an alkanol of from 1 to 4 carbons.

3. A process according to claim 1 wherein said alcohol is methanol.

4. A process according to claim 1 wherein said alcohol is ethanol.

5. A process according to claim 1 wherein said crude composition in (a) is treated with from about 4 to 15 parts by weight of water and alcohol per part by weight of amine in said crude composition.

6. A process according to claim 1 wherein the weight ratio of water to alcohol in (a) ranges from about 1:1 to 1:4.

7. A process according to claim 1 wherein said treating in (a) is at a temperature of from about 50° to 250°F.

8. A process according to claim 1 wherein said acid is an inorganic acid.

9. A process according to claim 1 wherein said acid is hydrochloric acid.

10. A process according to claim 1 wherein said acid is an organic acid of from 2 to 6 carbons.

11. A process according to claim 1 wherein said acid is an organic acid of from 2 to 4 carbons.

12. A process according to claim 1 wherein said acid is acetic acid.

13. A process according to claim 1 wherein said acid is propionic acid.

14. A process according to claim 1 wherein said crude composition in (a) is treated with from about 1 to 1.6 mole of said acid per mole of said amine.

15. A process according to claim 1 wherein said aqueous layer in (a) has a pH of from 2 to 7.

16. A process according to claim 1 wherein said aqueous layer in (a) has a pH of about 3 to 6.5.

17. A process according to claim 1 wherein said aqueous layer in (b) prior to treating in (c) is contacted with a liquid hydrocarbon having from 4 to 10 carbons.

18. A process according to claim 17 wherein said hydrocarbon is heptane.

19. A process according to claim 1 wherein from one to three moles of said base are added in (c) per mole of said acid added in (a).

20. A process according to claim 1 wherein said base in (c) is sodium hydroxide.

21. A process according to claim 1 wherein said secondary alkyl primary amine separated in (d) is a mixture of amines having from 14 to 26 carbon atoms.

* * * * *